(12) United States Patent  
Vonog et al.

(10) Patent No.: US 8,959,141 B2  
(45) Date of Patent: Feb. 17, 2015

(54) SYSTEM AND METHOD FOR PERVASIVE COMPUTING

(75) Inventors: Stanislav Vonog, San Francisco, CA (US); Tara Lemmey, San Francisco, CA (US); Nikolay Surin, San Francisco, CA (US); Vadim Shtayura, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 535 days.

(21) Appl. No.: 13/271,116

(22) Filed: Oct. 11, 2011

(65) Prior Publication Data

US 2012/0124128 A1    May 17, 2012

Related U.S. Application Data

(63) Continuation of application No. 12/569,884, filed on Sep. 29, 2009, now Pat. No. 8,060,560.

(60) Provisional application No. 61/237,611, filed on Aug. 27, 2009.

(51) Int. Cl.
*G06F 15/16* (2006.01)
*G06F 9/50* (2006.01)

(52) U.S. Cl.
CPC .................................... *G06F 9/5072* (2013.01)
USPC ........................... 709/203; 709/217; 709/223

(58) Field of Classification Search
CPC ... G06F 9/5072; G06F 3/0604; G06F 3/0631; G06F 3/0665; G06F 9/5011; G06F 3/0622; G06F 3/0661; G06F 9/5016

USPC .......................................... 709/203, 217-228
See application file for complete search history.

(56) References Cited

U.S. PATENT DOCUMENTS

| | | | |
|---|---|---|---|
| 7,181,017 B1 | 2/2007 | Nagel et al. | |
| 8,060,560 B2 * | 11/2011 | Vonog et al. | ............ 709/203 |
| 2003/0046401 A1 | 3/2003 | Abbott et al. | |
| 2006/0184978 A1 | 8/2006 | Casey | |
| 2006/0187858 A1 | 8/2006 | Kenichi et al. | |
| 2006/0239190 A1 | 10/2006 | Kumar et al. | |
| 2007/0053513 A1 | 3/2007 | Hoffberg | |
| 2008/0189468 A1 | 8/2008 | Schmidt et al. | |
| 2009/0089078 A1 | 4/2009 | Bursey | |
| 2009/0111453 A1 | 4/2009 | Hsu et al. | |
| 2009/0187654 A1 | 7/2009 | Raja et al. | |
| 2010/0122184 A1 | 5/2010 | Vonog et al. | |
| 2010/0165947 A1 | 7/2010 | Taniuchi et al. | |

(Continued)

OTHER PUBLICATIONS

International Search Report-PCT/US2010/047047 dated Oct. 13, 2010.

(Continued)

*Primary Examiner* — Haresh N Patel
(74) *Attorney, Agent, or Firm* — Perkins Coie LLP

(57) ABSTRACT

A method and system for pervasive computing are disclosed. According to one embodiment, a computer implemented method comprises a server communicating with a first device in a cloud computing environment, wherein the first device can detect surrounding devices, and an application program executable by the server, wherein the application program is controlled by the first device and the output of the application program is directed by the server to one of the devices detected by the first device.

20 Claims, 17 Drawing Sheets

(56) References Cited

U.S. PATENT DOCUMENTS

2010/0198972 A1 8/2010 Umbehocker
2011/0055317 A1 3/2011 Vonog et al.

OTHER PUBLICATIONS

Non-Final Office Action Mailed Jan. 7, 2011 in Co-Pending U.S. Appl. No. 12/569,884, filed Sep. 29, 2009.
Notice of Allowance Mailed Sep. 27, 2011 in Co-Pending U.S. Appl. No. 12/569,884, filed Sep. 29, 2009.
Office Action dated Jun. 19, 2012, from Canadian Patent Application No. 2,771,785 filed Aug. 27, 2010 and issued on Feb. 5, 2013.
Office Action dated Jun. 27, 2013 from Australian Patent Application No. 2010286543 filed Aug. 27, 2010.
"OSGi Service Platform Core Specification", The OSGi Alliance, Release 4, Version 4.1, Apr. 2007 [Retrieved from Internet]. Retrieved from <http://www.osgi.org/Release4/Download>.
Co-Pending U.S. Appl. No. 12/569,884 of Vonog, S., et al., filed Sep. 29, 2009.

\* cited by examiner

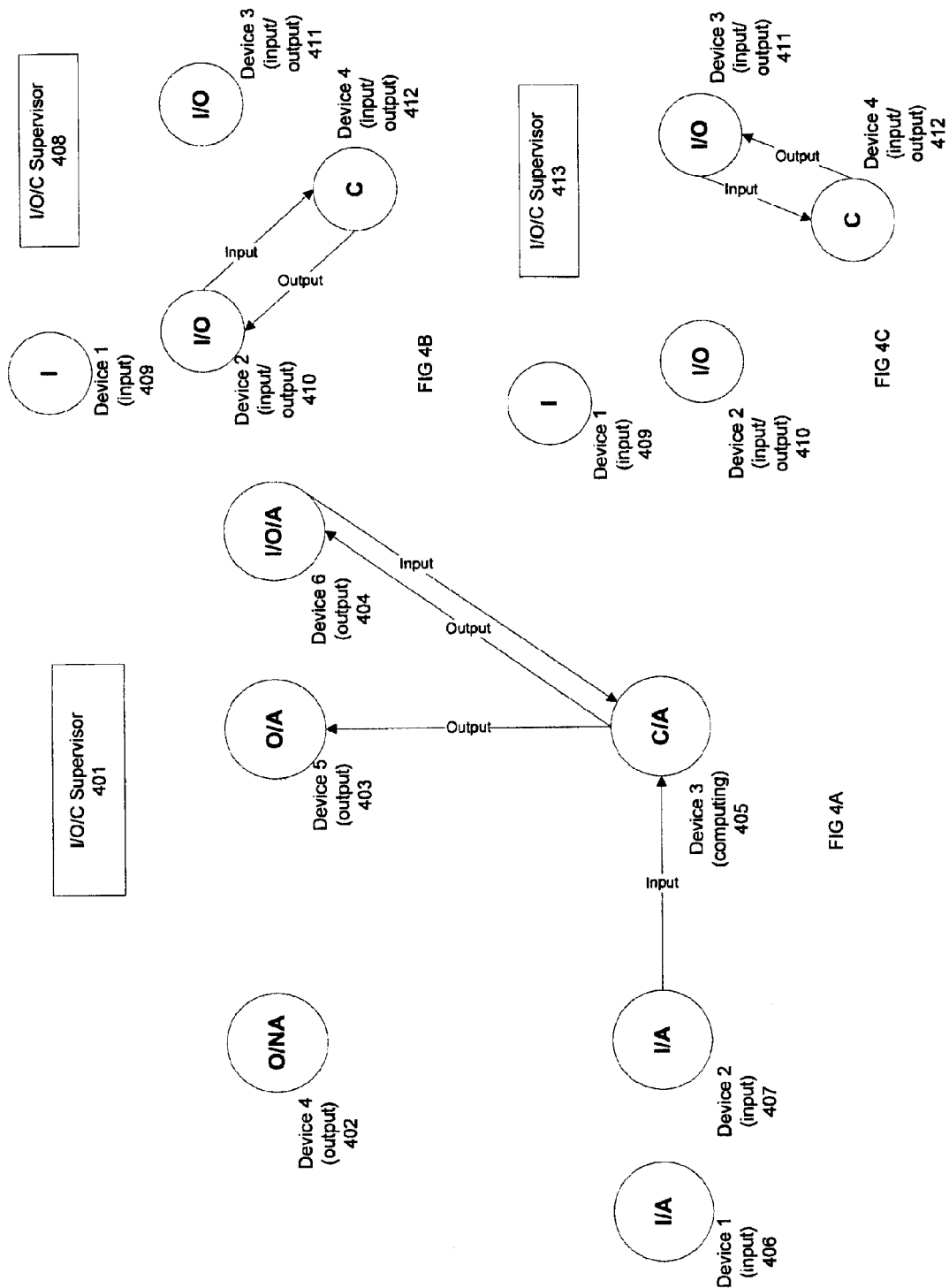

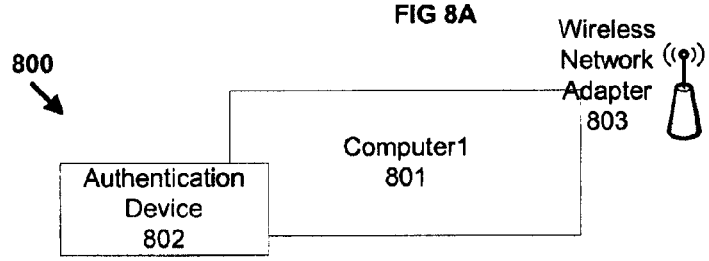
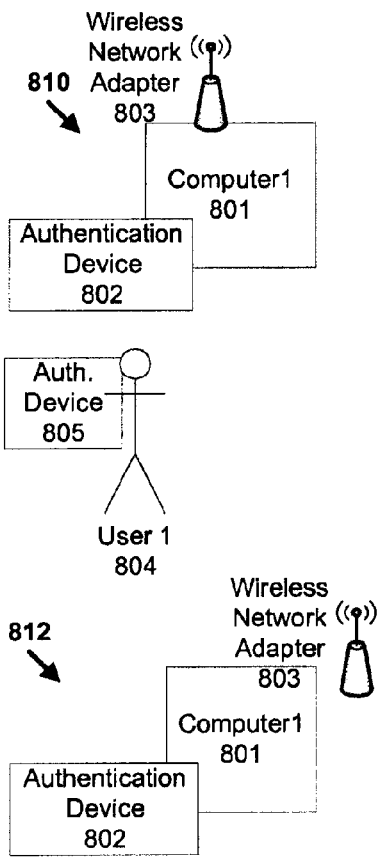
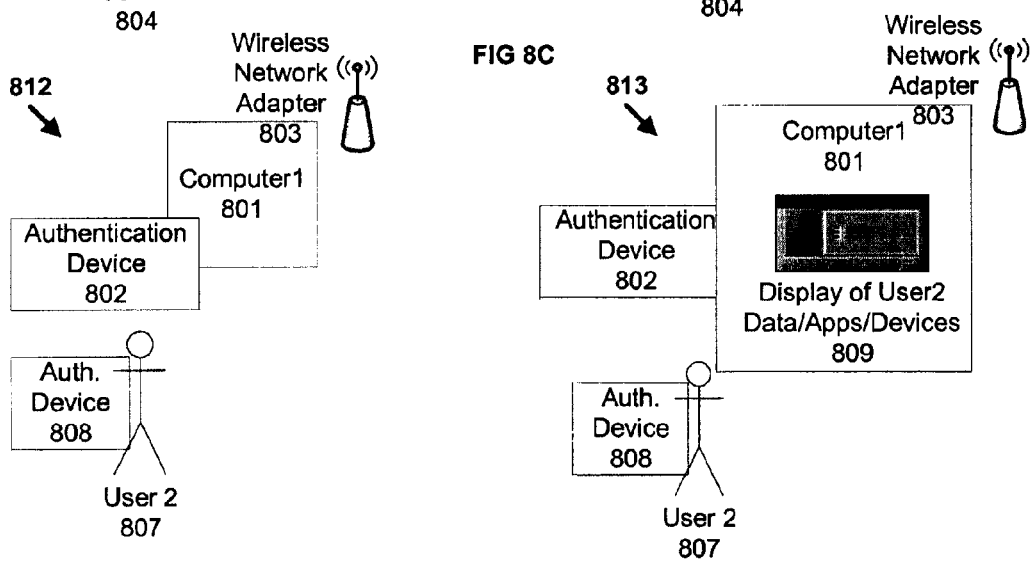

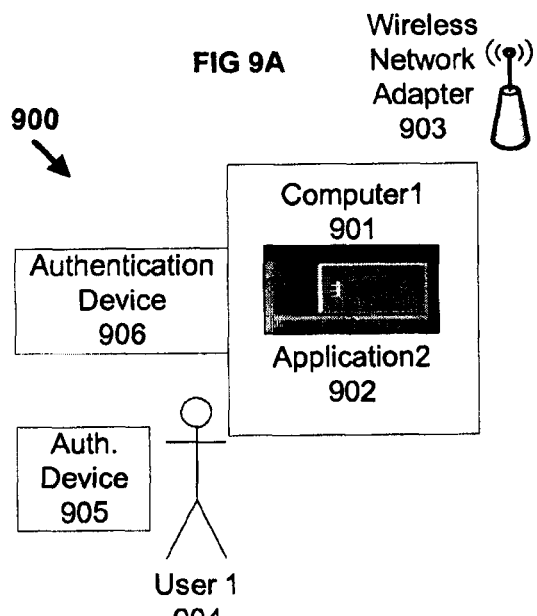
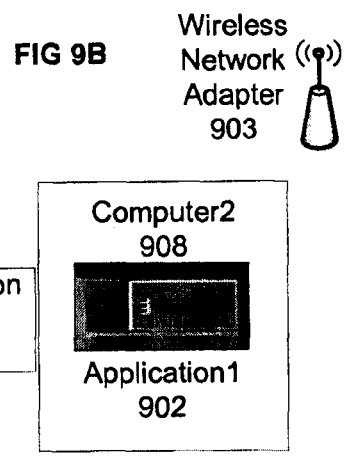
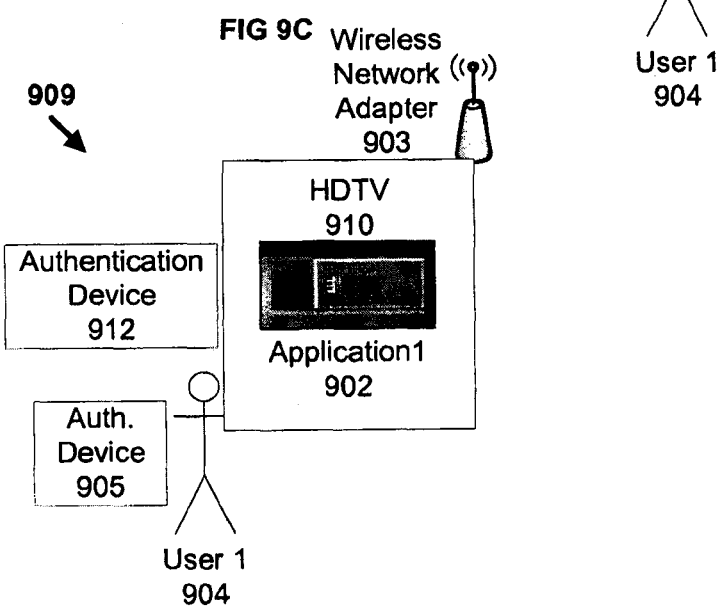

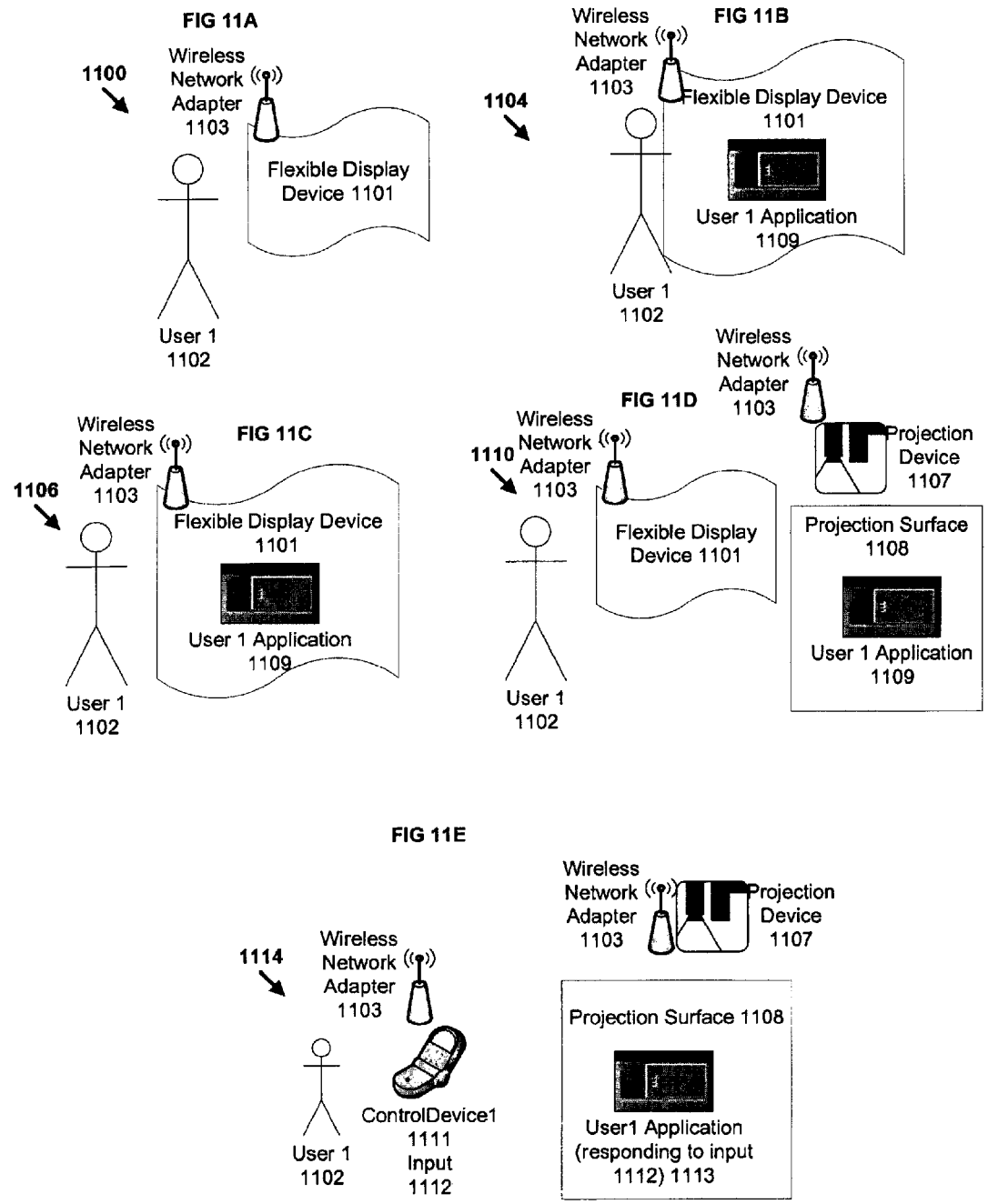

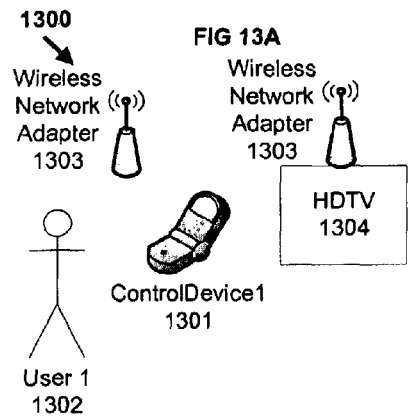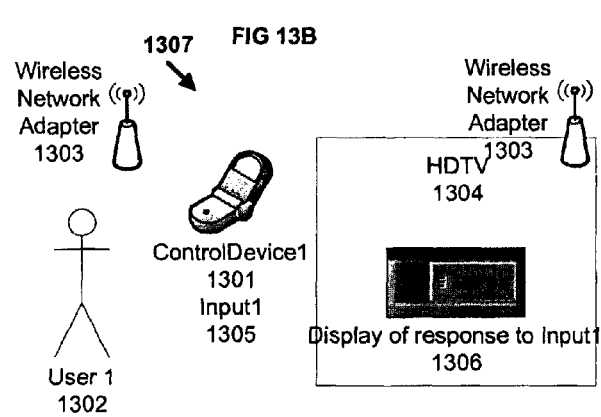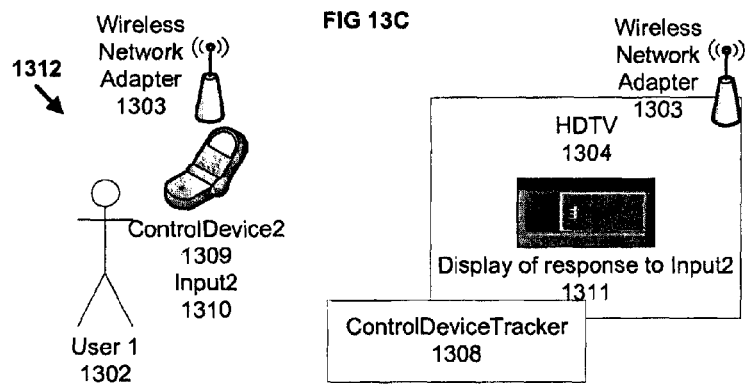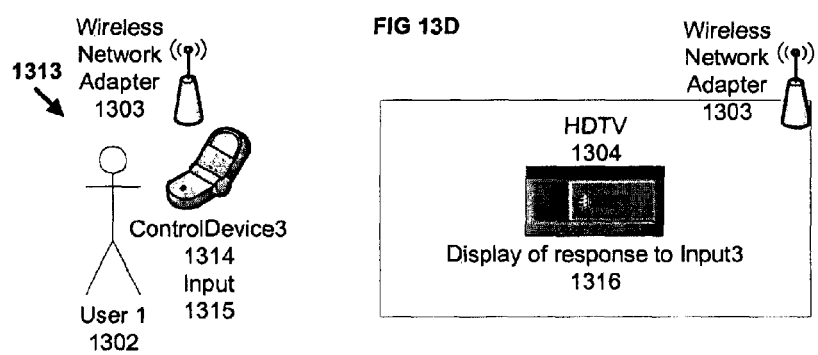

SYSTEM AND METHOD FOR PERVASIVE COMPUTING

CROSS-REFERENCE TO RELATED APPLICATIONS

This application is a continuation of U.S. Patent application Ser. No. 12/569,884, now U.S. Patent Ser. No. 8,060,560, entitled "SYSTEM AND METHOD FOR PERVASIVE COMPUTING", filed Sep. 29, 2009, which claims the benefit of and priority to U.S. Provisional Patent application Ser. No. 61/237,611 entitled "OPERATING ENVIRONMENT AND USER INTERFACE FOR PERVASIVE COMPUTING" filed on Aug. 27, 2009, all of which are incorporated herein by reference.

FIELD

The present system relates in general to computer applications and, more specifically, to a system and method for pervasive computing.

BACKGROUND

Users are increasingly surrounded by multiple computers and electronic devices. Users typically have multiple computers at home, multiple computers at work, multiple displays, a variety of cell phones, portable computers, music players, TVs, game consoles, photo cameras, and reading devices.

Recently developed methods for controlling devices include multitouch phones or surfaces, voice commands, motion sensing controllers (for example, the Wii Remote), body tracking systems (for example, Project Natal), gaze tracking, and game console-like controllers.

Existing user interfaces assume the user of a single computer or a mobile device at a time. The GUI paradigm is still often desktop. Desktop GUI and traditional single-machine operating systems do not work well in the new world of multiple devices and new UI capabilities beyond mouse and keyboard.

Computing devices are loaded with many software applications, most of which are unused. Applications are tied to a particular hardware machine, are not mobile, and are difficult and costly to maintain and upgrade.

Users who have multiple devices can not combine capabilities of one device (e.g. a multi-touch capability of an iPhone) to use with another device (e.g. big screen plasma TV).

Although computers and devices are connected within hundreds of thousands of private local networks or as part of the Internet, the devices are largely unaware of each other. Transferring and synchronizing data between them (i.e. photos) is often a long and painful task.

Existing web applications aim to solve some of these problems. Web applications can be written to provide functions similar to traditional software application but eliminate the need to install them and slow down the physical computer. Web applications can also be built to enable access to data stored on servers from all of the users' devices thus eliminating the need for data synchronization.

However, web applications and browser-based model have some limitations which include:

User experience built with html/javascript is basic and limited

Flash/Silverlight do not have multi-threading model and do not allow to build full-featured applications Communication/collaboration software cannot be built effectively using web application model or RIA model.

Multi-machine computing environments have recently been developed to address enterprise needs for software deployment, provisioning and management and/or to operate data centers (VMWare vSphere, Citrix Cloud Center, Amazon Elastic Compute Cloud, Microsoft Windows Azure, and others). However, none of these computing environments assume consumer/multi-device scenarios, nor do they provide a user interface (the environments are used to run virtual machines with web applications or desktop operating systems).

SUMMARY

A method and system for pervasive computing are disclosed. According to one embodiment, a computer implemented method comprises a server communicating with a first device in a cloud computing environment, wherein the first device can detect surrounding devices, and an application program executable by the server, wherein the application program is controlled by the first device and the output of the application program is directed by the server to one of the devices detected by the first device.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

FIG. 4A illustrates an exemplary device communication graph within a pervasive computing environment, according to one embodiment.

FIGS. 4B and 4C illustrate an exemplary device communication graph before and after the transfer of an application within a pervasive computing environment, according to one embodiment.

FIGS. 8A-8C illustrate an exemplary pervasive computing environment scenario wherein any computer may be used by any user, according to one embodiment.

FIGS. 9A-9C illustrate an exemplary pervasive computing environment scenario wherein an application follows a user, according to one embodiment.

FIGS. 11A-11E illustrate an exemplary pervasive computing environment scenario wherein an application moves from an electronic newspaper to a table surface, according to one embodiment.

FIGS. 13A-13D illustrate an exemplary pervasive computing environment scenario wherein a device responds to input from a control device, according to one embodiment.

DETAILED DESCRIPTION

Figure 1:
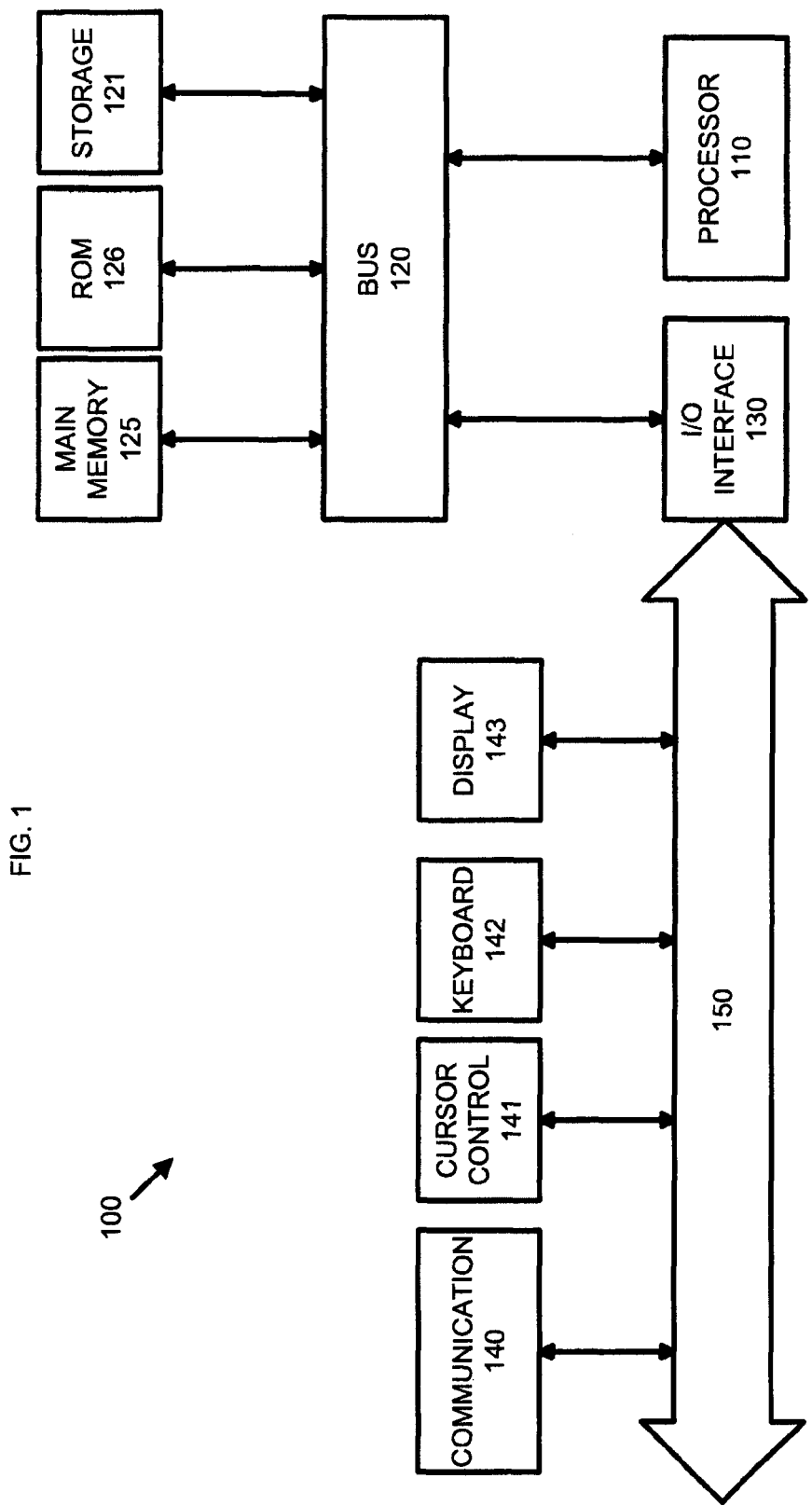
FIG. 1 illustrates an exemplary computer architecture for use with the present system, according to one embodiment.

A method and system for pervasive computing are disclosed. According to one embodiment, a computer implemented method comprises a server communicating with a first device in a cloud computing environment, wherein the first device can detect surrounding devices, and an application program executable by the server, wherein the application program is controlled by the first device and the output of the application program is directed by the server to one of the devices detected by the first device.

The present method and system incorporate a transfer protocol fully described in U.S. patent application Ser. No. 12/569,876 filed on Sep. 29, 2009, and is hereby incorporated by reference in its entirety.

Terms and accompanying definitions used throughout the document include:

Device: any electronic, bio-electronic or nano-electronic device capable of input, output, or computing. Examples of devices include but are not limited to laptop computers, servers, personal computers, netbooks, mobile devices, smartphones, projectors, televisions.

Application: a piece of software to be used by a client. Examples of applications include but are not limited to Microsoft Office applications, photo editing software, and media players.

Input capabilities: the ability for a device to receive input information from a human or a device, or other application. Examples of input capabilities include but are not limited to human voice, video data, motion detection, accelerometer sensors, temperature sensors, pressure sensors (air pressure or pressure from touch, for example), eye movements, keyboard, and mouse, data files, data streams received from other applications.

Output capabilities: the ability for a device to transmit data as output to other devices or applications or to render output in a way that can be perceived by a human. Examples of output capabilities are display capabilities on a large or a small screen, 3D displays, sound Computing capabilities: the ability for a device to perform computing by executing a program written in one of the programming languages.

I/O/C graph: an input, output, and computing capabilities graph. The graph is a logical representation of all devices being used by a user at any given time and their relationships. The I/O/C graph specifies which devices being used by any given user. It also specifies which devices provide computing capabilities, which devices provide input and output capabilities and how these devices route input and output between each other (and also probably duplicate input and output streams). I/O/C graph is graph generated for every user in the system every time they are using the pervasive operating environment.

I/O/C supervisor: an entity with which devices communicate. Devices communicate capabilities to a supervisor, and a supervisor is unique for each user. Supervisor maintains and orchestrates an I/O/C graph for each user at any given time they are using the pervasive operating environment. I/O/C Supervisor maintains access to data, applications and devices for each user.

Name service: provides users with the ability to associate a fixed name with a device in order to abstract from physical network addresses (such as IP addresses).

Device agent: pervasive computing agent on each device for use within the present system.

Data provider: an entity responsible for communicating with data storage providers to retrieve user data.

Data storage provider: remote user data storage service.

Authentication and security gateway: an entity for authenticating a user.

Virtual computing device provider: an entity responsible for providing a virtual computing device upon request from other components of the system such as users' I/O/C supervisors.

Application streamer: an entity responsible for deploying an application onto a virtual or physical computing device using application streaming technology.

Application image storage: storage for images of applications to be deployed on physical or virtual computing devices using application streaming technology. Alternatively, the application image storage may contain packaged applications to be installed on virtual or physical computing devices via standard process of software installation within a given operating system.

Virtual machine provider: an entity responsible for providing a virtual machine upon request.

Input encoder: an entity capable of encoding input received.

Input decoder: an entity capable of decoding input received.

Input queue: a buffer for received input.

Output capturer: an entity capable of capturing output.

Output renderer: an entity capable of properly rendering output.

Output encoder: an entity capable of encoding output to be transmitted.

Output decoder: an entity capable of decoding output to be transmitted

Network stack: an entity for device communication within the pervasive computing environment. The network stack should enable high-performance and low latency data transmission.

User interface (UI) shell: user interface on a device for user interaction with the pervasive computing environment.

Device acquisition: each device can discover surrounding devices and acquire them (or not, depending upon client desire). Acquisition places a device in a user's personal pervasive computing environment.

The present system for pervasive computing enables devices to run applications regardless of their OS and hardware. Users can access their data, applications and virtual machines from any device, and a wide variety of computing devices can be supported. Applications can migrate between devices almost instantaneously (i.e in very short periods of time ranging from a few hundred milliseconds to a few seconds depending on network conditions and other factors). The personal computing environment within the pervasive computing system provides a user interface (UI) shell for managing data, applications, virtual and physical devices. Devices are able to discover each other and utilize capabilities resident to other devices. The use of a pool of "hot" virtual machines in combination with application streaming technology minimizes the number of virtual appliances (i.e. virtual machines running specific applications) that need to be in a ready state.

The present pervasive operating environment can operate multiple input, output and computing devices as well as robotic devices. The devices can be physical and virtual, examples include but are not limited to: laptops, computers (macs and pcs), TVs, foldable electronic screens, robotic devices, mobile devices, cell phones, iPhones, tablets, tracking camera, motion sensing, augmented reality displays built into sunglasses, helmets or contact lenses, acceleration sensing, motion tracking systems, multitouch surfaces, 3D display system (holographic or not), projection tables and walls with computing units attached, and RFID readers and tags.

According to the present system, a user can have unlimited number of devices in their computing environment.

A user interface of the present system, according to one embodiment, supports motion-sensing, body tracking, multitouch, voice and gaze input capabilities along with traditional input capabilities.

User data and applications are accessible from any device, and can migrate between screens, computers and devices. Applications can be shared between multiple users—i.e. any number of uses can see an application simultaneously and work with. This enables seamless collaboration; an example is video chat along with a presentation. Other examples include audio chat and text chat.

Devices are able to discover each other and each other's display, input, and computing capabilities. Devices can share their input capabilities and display capabilities with each other.

The present system supports multiple operating systems even support devices with no operating system. The present system also supports multiple data storage provide and computing providers. Users choose computing providers for their personal pervasive computing environments based on geography, cost, bandwidth and other factors.

It will be appreciated that one embodiment of the receivers discussed above can be contact lenses displays. Contact lenses displays are discussed in "Augmented Reality in a Contact Lens", IEEE Spectrum September 2009, herein incorporated by reference. Such contact lenses are able to display information to a wearer and communicate over a wireless device. These devices can function as receivers as discussed above and augment a user's reality by overlaying graphics in the wearer's field of vision. Being a compact device, these devices can be limited in functionality, for example, only rendering graphics commands and text. One embodiment of such devices can display relevant text as the wearer focuses on objects in his environment.

It will be appreciated that the graphical output discussed above can include 3D graphics. 3D graphics can be special graphics shot by multiple cameras, then merged together to create a hologram or other 3D image. Such 3D graphics is easily supported by the system above: the 3D graphics are compressed as appropriate by the server, and transmitted to a receiver for rendering. Assuming the receiver has appropriate computing resources and rendering capabilities, the 3D graphics can be rendered to the user. 3D graphics are discussed in "3D: It's Nearly There" The Economist—Technology Quarterly. Sep. 5, 2009, p. 22, herein incorporated by reference.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

Figure 2:
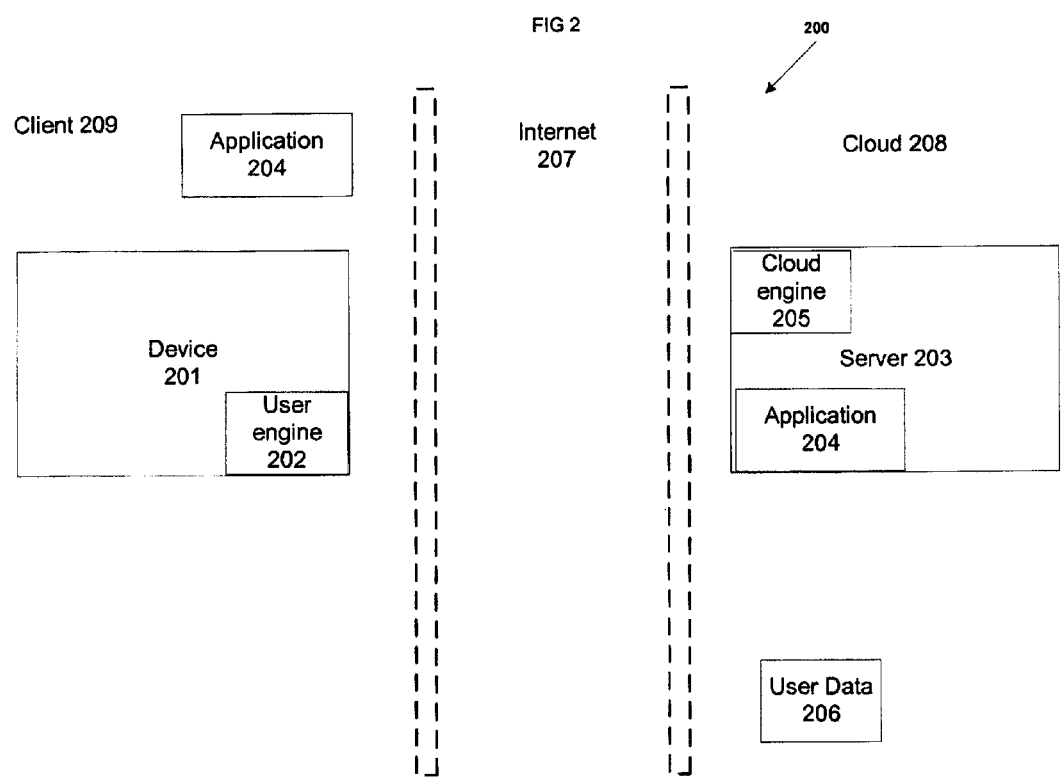
FIG. 2 is an exemplary system level diagram of a pervasive computing environment, according to one embodiment.

FIG. 2 is an exemplary system level diagram of a pervasive computing environment, according to one embodiment. A pervasive computing system 200 has a client 209 communicating with a data center ("cloud") 208 via the internet 207. The client 209 has a device 201 running a user engine 202, and the device is displaying an application 204 that is not installed on the device 201. The cloud 208 has a server 203 running a cloud engine 205 and the application 204. The cloud also has access to user data 206 not stored on the server 203 or the device 201.

Figure 3A:
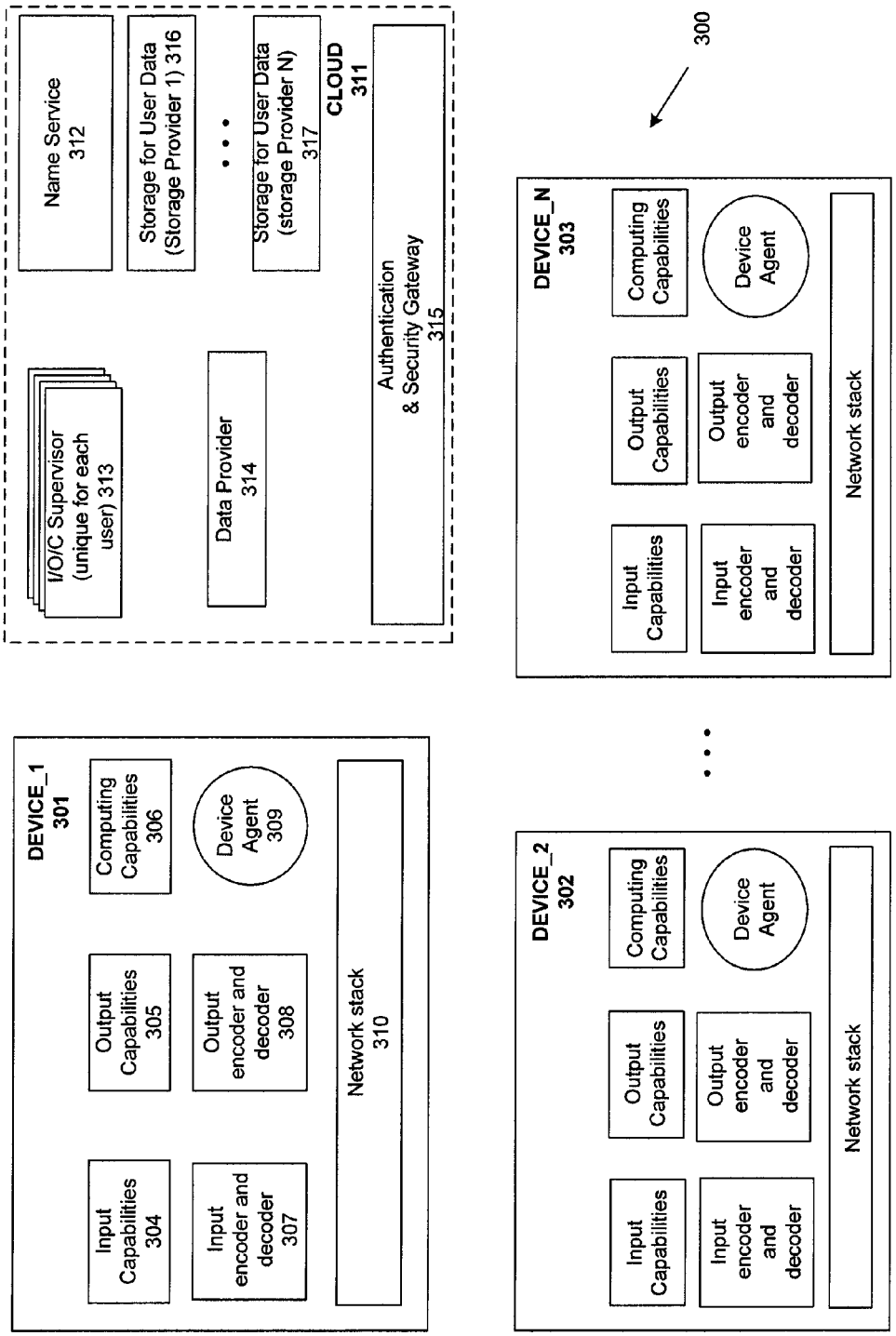
FIG. 3A is an exemplary system level diagram of a pervasive computing environment utilizing a single server, according to one embodiment.

FIG. 3A is an exemplary system level diagram of a pervasive computing environment utilizing a single server, according to one embodiment. A pervasive computing environment 300 has a cloud 311 and one or more devices (device_1 301, device_2 302, device_N 303). A device_1 301 can have input capabilities 304, output capabilities 305, computing capabilities 306, an input encoder and decoder 307, an output encoder and decoder 308, a device agent 309, and a network stack 310. A device, according to one embodiment, can have any combination of the referenced components and is not required to have all of them. A cloud 311 has a supervisor 313 (referred to as an I/O/C supervisor, for input, output, and computing), a name service 312, a data provider 314 in communication with storage providers (316,317), and an authentication and security gateway 315.

Figure 3B:
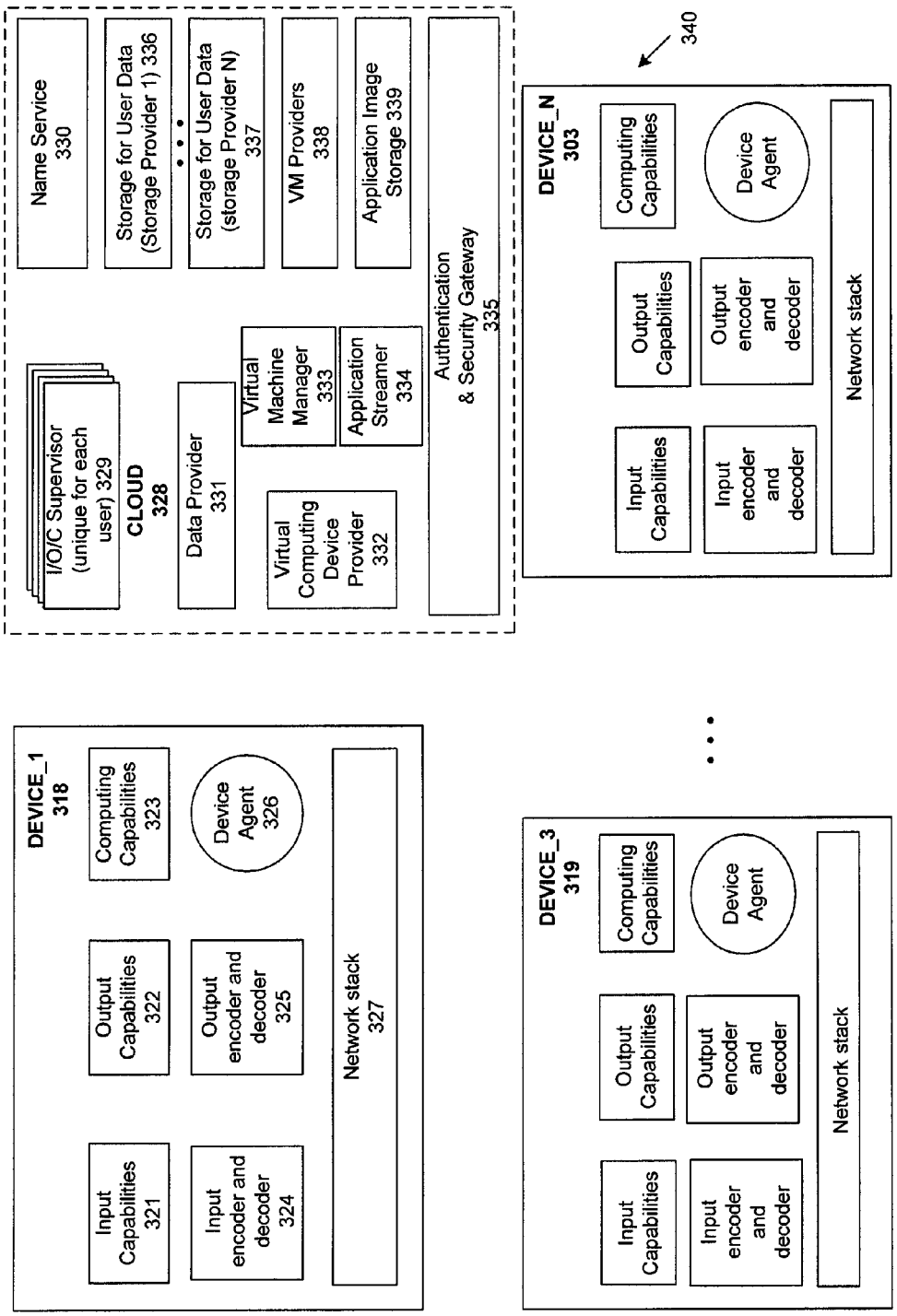
FIG. 3B is an exemplary system level diagram of a pervasive computing environment utilizing multiple servers, according to one embodiment.

FIG. 3B is an exemplary system level diagram of a pervasive computing environment utilizing multiple servers, according to one embodiment. A pervasive computing environment 340 has a cloud 328 and one or more devices (device_1 318, device_2 319, device_N 320). A device_1 318 can have input capabilities 321, output capabilities 322, computing capabilities 323, an input encoder and decoder 324, an output encoder and decoder 325, a device agent 326, and a network stack 327. A device, according to one embodiment, can have any combination of the referenced components and is not required to have all of them. A cloud 328 has a supervisor 329 (referred to as an I/O/C supervisor, for input, output, and computing), a name service 330, a data provider 331 in communication with storage providers (336, 337), and an authentication and security gateway 335. The cloud 328 also has a virtual computing device provider 332 in communication with a virtual machine manager 333 and an application streamer 334. The virtual machine manager 333 is in communication with virtual machine (VM) providers 338 and the application streamer 334 is in communication with application image storage 339.

FIG. 4A illustrates an exemplary device communication graph within a pervasive computing environment, according to one embodiment. An input/output/computing supervisor 401 (herein referred to as "supervisor") is in communication with a number of devices (402, 403, 404, 405, 406, 407) all within the vicinity of each other. Devices can have input, output, and/or computing capabilities. Devices are able to discover each other, and optionally acquire each other in order to leverage existing functionality on other devices. Device 4 402 is an output device, and has not been acquired. Device 1 406 is an input device, and has been acquired. Device 2 407 is also an input device, and has been acquired. Device 3 405 is a computing device, and has been acquired. Device 5 407 is an output device, and has been acquired. Device 6 404 is an input and output device, and has been acquired.

An example of an input device to be used for device 1 can be an Apple iPhone with an input encoder. An example of an input device to be used for device 2 can be a full-body motion sensing camera with an input encoder. An example of a computing device to be used for device 3 can be a server with an 8-core CPU and a powerful GPU, having an output encoder and an input encoder. An example of an output device to be used for device 4 can be a projection surface having a projector with an output encoder. An example of an output device to be used for device 5 can be a television set with an output decoder. An example of an input and output device to be used for device 6 can be a multi-touch tabletop surface having an input encoder and an output decoder.

FIGS. 4B and 4C illustrate an exemplary device communication graph before and after the transfer of an application within a pervasive computing environment, according to one embodiment. In FIG. 4B, supervisor 408 is in communication with 4 devices that have all been acquired (409, 410, 411, 412). An input device, device 1 409 (for example, an Apple iPhone) is in the vicinity of an input/output device, device 2 410 (for example, a netbook). A computing device, device 4 412 (for example, a server with an 8-core CPU and a powerful GPU) is running an application and streaming to and from device 2 410. Device 3 411, an input and output device (for example a notebook) is acquired but not displaying an active application.

FIG. 4C also includes a supervisor 408 in communication with 4 devices that have all been acquired (409, 410, 411, 412). However, device 1 409 made a request to transfer the application displayed on device 2 410 to be displayed on device 3 411 instead. Device 4 412 is now streaming to device 3 411.

Figure 5:
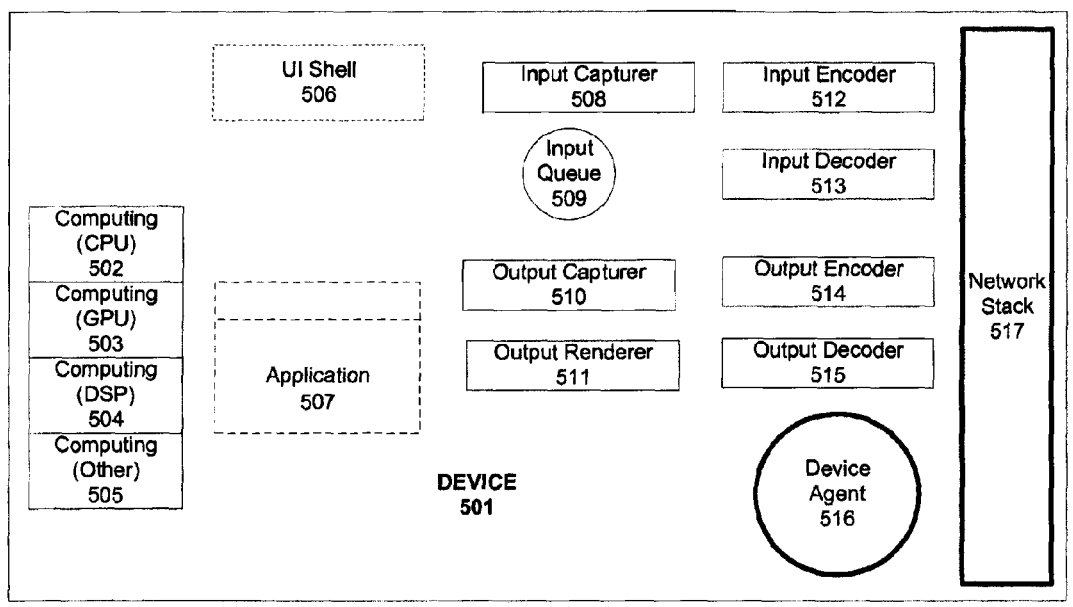
FIG. 5 illustrates an exemplary client architecture for use within a pervasive computing environment, according to one embodiment.

FIG. 5 illustrates an exemplary client architecture for use within a pervasive computing environment, according to one embodiment. A device 501 has a device agent 516 and a network stack 517. The device 501 also has at least one of an input capturer 508, an input encoder 512, an input decoder 513, an input queue 509, an output capturer 510, an output renderer 511, an output encoder 514, an output decoder 515, and computing components (502, 503, 504, 505). The device 501 may optionally have a user interface (UI) shell 506 and an application 507.

Figure 6A:
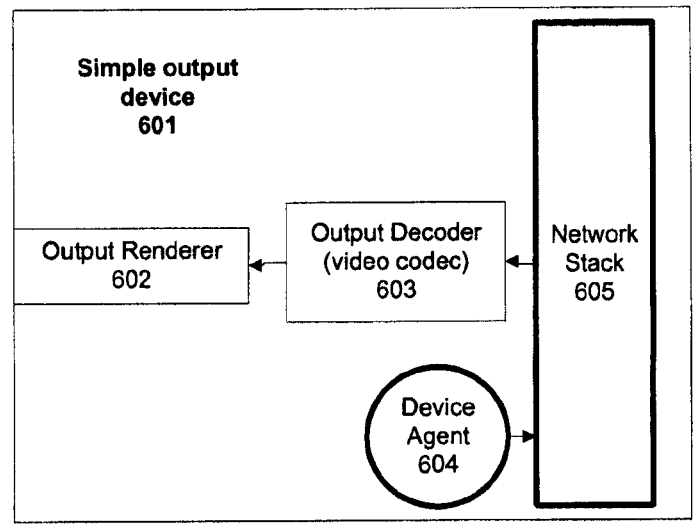
FIG. 6A illustrates an exemplary simple output device architecture for use within a pervasive computing environment, according to one embodiment.

FIG. 6A illustrates an exemplary simple output device architecture for use within a pervasive computing environment, according to one embodiment. A simple output device 601 has a device agent 604 and a network stack 605. The simple output device also has at least one of an output decoder 603 and an output renderer 602.

Figure 6B:
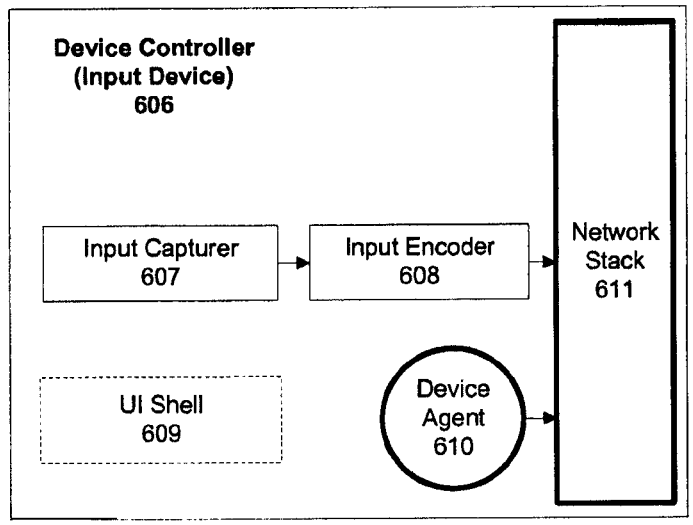
FIG. 6B illustrates an exemplary device controller architecture for use within a pervasive computing environment, according to one embodiment.

FIG. 6B illustrates an exemplary device controller architecture for use within a pervasive computing environment, according to one embodiment. A device controller 606 has a device agent 610 and a network stack 611. The device controller 606 also has at least one of an input capturer 607 and an input encoder 608. The device controller may optionally have a user interface (UI) shell 609.

Figure 6C:
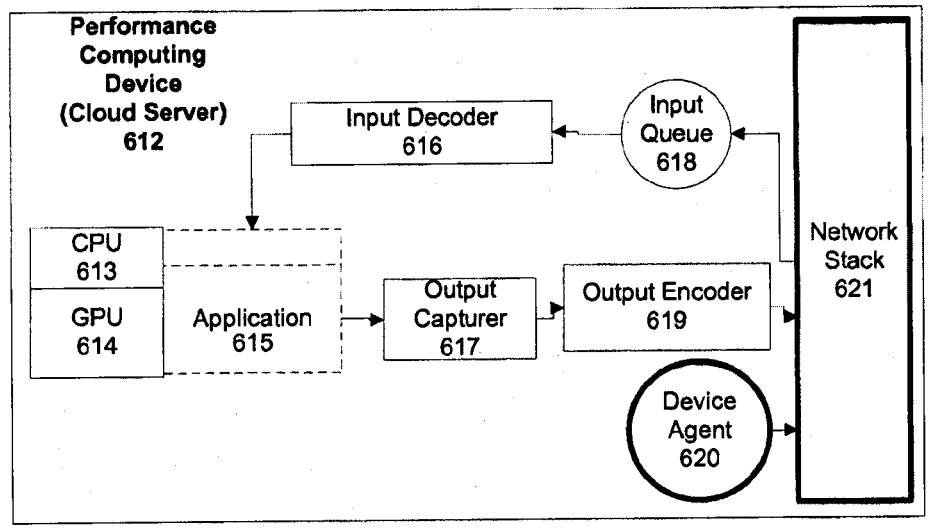
FIG. 6C illustrates an exemplary performance computing device architecture for use within a pervasive computing environment, according to one embodiment.

FIG. 6C illustrates an exemplary performance computing device architecture for use within a pervasive computing environment, according to one embodiment. A performance computing device (or cloud server) 612 has a device agent 620 and a network stack 621. The performance computing device has at least one of a CPU 613, a GPU 614, an input decoder 616, an input queue 618, an output capturer 617, and an output encoder 619. The performance computing device 612 may optionally have an application 615.

Figure 6D:
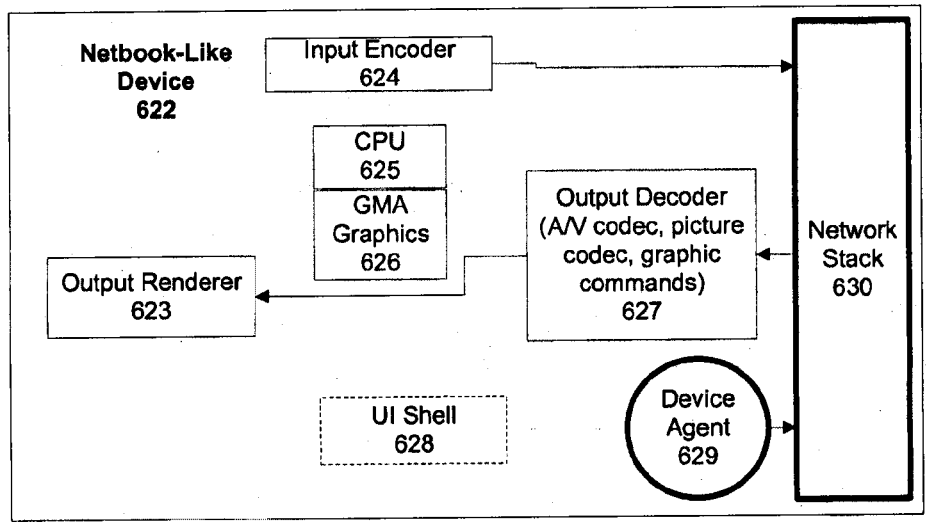
FIG. 6D illustrates an exemplary netbook-like device architecture for use within a pervasive computing environment, according to one embodiment.

FIG. 6D illustrates an exemplary netbook-like device architecture for use within a pervasive computing environment, according to one embodiment. A netbook like device 622 has a device agent 629 and a network stack 630. The netbook like device 622 also has at least one of an output decoder 627, an input encoder 624, a CPU 625, graphics 626, and an output renderer 623. The netbook like device 622 optionally has a user interface (UI) shell 628.

Figure 6E:
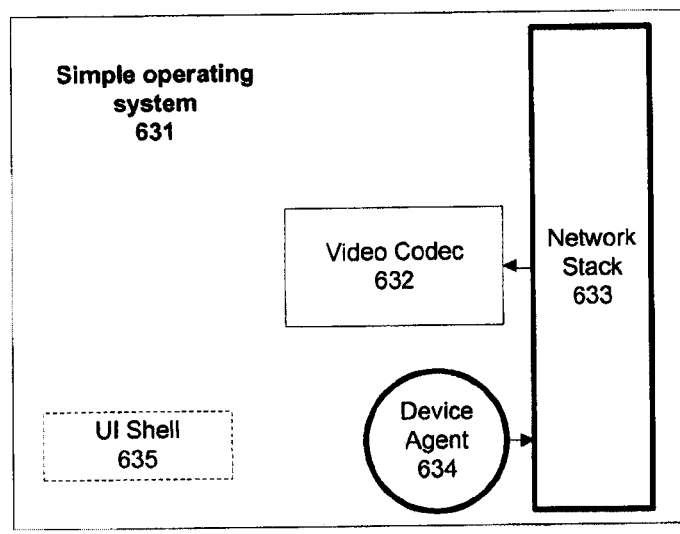
FIG. 6E illustrates an exemplary simple operating system architecture device for use within a pervasive computing environment, according to one embodiment.

FIG. 6E illustrates an exemplary simple operating system architecture device for use within a pervasive computing environment, according to one embodiment. A simple operating system 631 has a device agent 634 and a network stack 633. The simple operating system 631 has a video codec 632, and optionally has a user interface (UI) shell 635.

Figure 7:
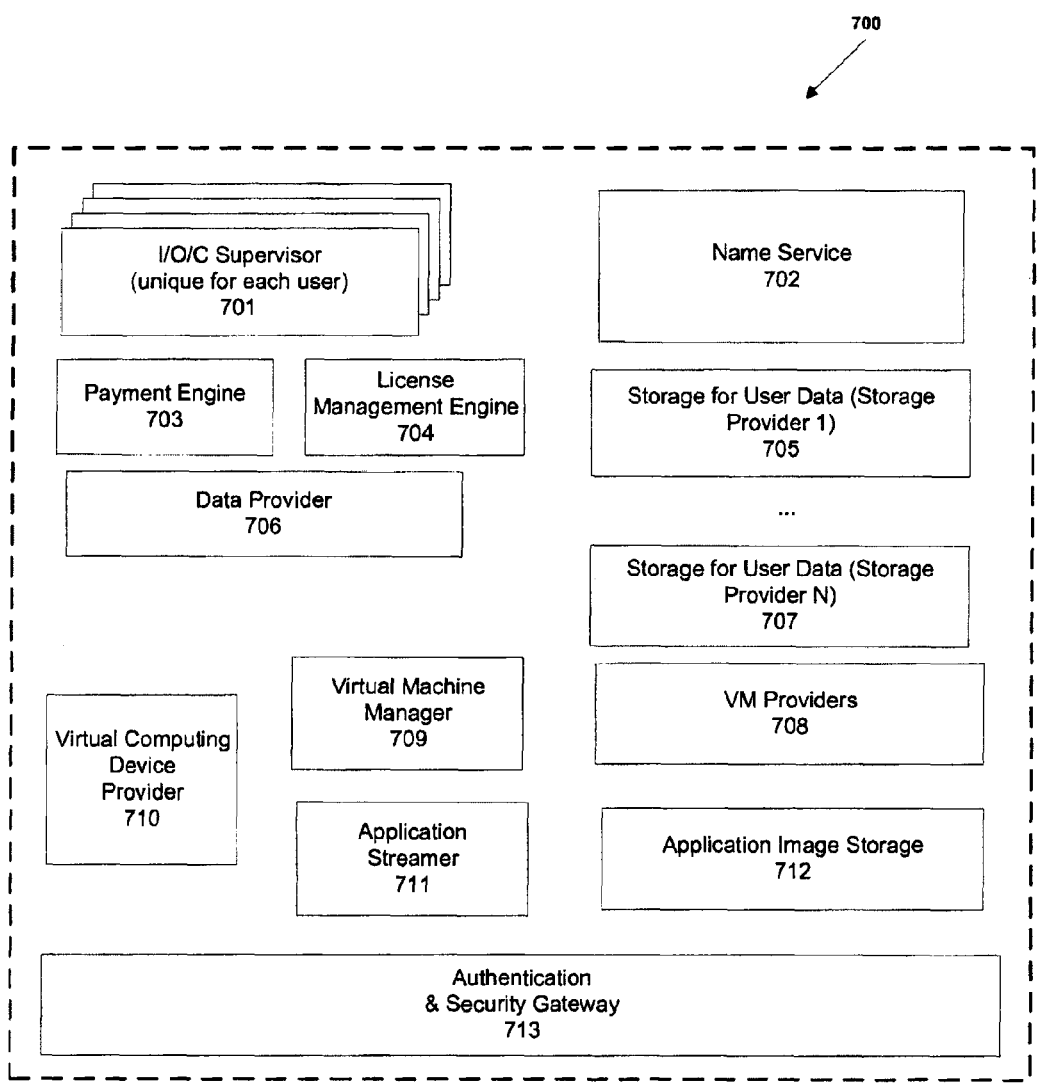
FIG. 7 illustrates an exemplary cloud architecture for use within a pervasive computing environment, according to one embodiment.

FIG. 7 illustrates an exemplary cloud architecture for use within a pervasive computing environment, according to one embodiment. A cloud architecture 700 has a supervisor 701 and a name service 702. The cloud architecture 700 has a data provider 706 in communication with storage providers (705, 707) and a virtual computing device provider 710. The virtual computing device provider 710 is in communication with a virtual machine manager 709 and an application streamer 711. The virtual machine manager 709 is in communication with virtual machine providers 708, and the application streamer 711 is in communication with application image storage 712. The cloud architecture 700 has an authentication and security gateway 713.

The cloud architecture 700 also has a payment engine 703 and a license management engine 704, according to one embodiment. The payment engine 703 coordinates payments from clients for services, and the license management engine 704 manages licensing protocols and requirements for applications utilized in the pervasive computing environment.

FIGS. 8A-8C illustrate an exemplary pervasive computing environment scenario wherein any computer may be used by any user, according to one embodiment. The computer presents a user interface shell for the user to manage data, applications, virtual and physical computing devices and robots. The user completes tasks, de-authenticates, and the computer hides the user's personal computing environment. A subsequent user may then access the computer, be authenticated, and access his or her data, applications, virtual computers, as well as local and public devices. The scenario is enabled by a cloud operating environment and above referenced protocol. It would be impossible for the computer to store data of all users and have their applications available.

An exemplary pervasive computing environment 800 includes a computer1 801, having an authentication device 802. Computer1 801 is connected to a network using a wireless network adapter 803. An exemplary pervasive computing environment 810 includes the computer1 801 having the authentication device 802, the computer1 801 connected to a network using a wireless network adapter 803. The environment 810 includes a user1 804 having an authentication device 805. The user1 804 places the authentication device 805 in an appropriate vicinity of the authentication device 802 and the user1's 804 data is introduced into the computer1 801. The resulting environment 811 includes a display of the user1's data, applications, and devices 806 on computer1 801. When user1 804 leaves the vicinity (more specifically, when user1's 804 authentication device 805 is no longer in the vicinity of the authentication device 802), user1's 804 data is no longer displayed and accessible on computer1 801 and the environment returns to the state illustrated in 800.

A user2 807 may then access computer1 801 as in the exemplary computing environment 812. Exemplary computing environment 812 includes computer1 801 having the authentication device 802, the computer1 801 connected to a network using a wireless network adapter 803. The environment 810 includes a user2 807 having an authentication device 808. The user2 807 places the authentication device 808 in an appropriate vicinity of the authentication device 802 and the user2's 807 data is introduced into the computer1 801. The resulting environment 813 includes a display of the user2's data, applications, and devices 809 on computer1 801. When user2 807 leaves the vicinity (more specifically, when user2's 807 authentication device 808 is no longer in the vicinity of the authentication device 802), user2's 807 data is no longer displayed and accessible on computer1 801 and the environment returns to the state illustrated in 800.

FIGS. 9A-9C illustrate an exemplary pervasive computing environment scenario wherein an application follows a user, according to one embodiment. A user is logged in to his or her personal computing environment on a laptop and has an application running. The application is in fact running in a cloud operating environment and can be any operating system or application. The user moves away from his or her laptop and approaches a television (RFID readers sense the user and an attached PC authenticates the user) and the application instantly moves to the television. An exemplary pervasive computing environment 900 includes a user1 904 having an authentication device 905. User1 904 is authenticated by an authentication device 906 (by placing authentication device 905 in an appropriate vicinity of authentication device 906) and is running an application1 902 on computer1 901. Computer1 901 is connected to a network using a wireless network adapter 903.

User1 904 moves away from computer1 901 and towards a computer2 908 in a pervasive computing environment 907. Computer1 908 is connected to a network using a wireless network adapter 903. User1 904 is authenticated by placing authentication device 905 in an appropriate vicinity of authentication device 911, and application1 902 automatically transfers to computer1 908 in the same state as it was left in on computer1 901 before user) 904 walked away.

User1 904 can walk toward yet another environment 909, the environment 909 including an HDTV 910 connected to a network using a wireless network adapter 903. HDTV 910 has an authentication device 912, and when user1's 904 authentication device enters the vicinity user1 904 is authenticated. Once user1 904 has been authenticated, application1 902 is displayed on HDTV 910 in the same state as it was on computer2 908 before user1 904 walked away.

Figure 10A:
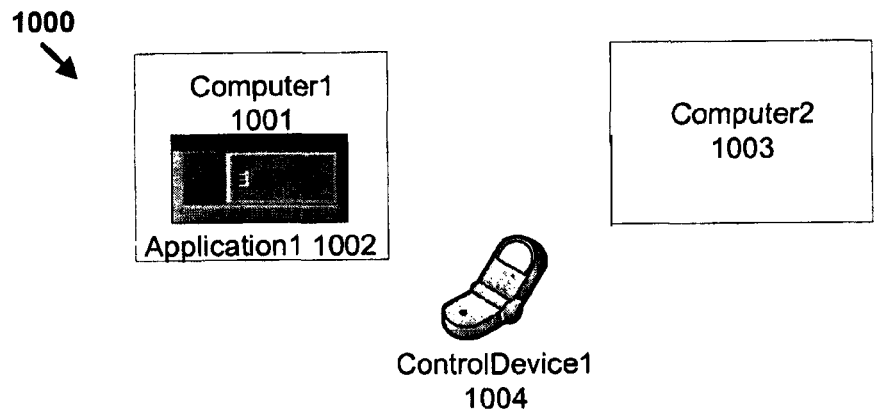
FIGS. 10A-10C illustrate an exemplary pervasive computing environment scenario wherein a software application is independent from a hardware device, according to one embodiment.
Figure 10B:
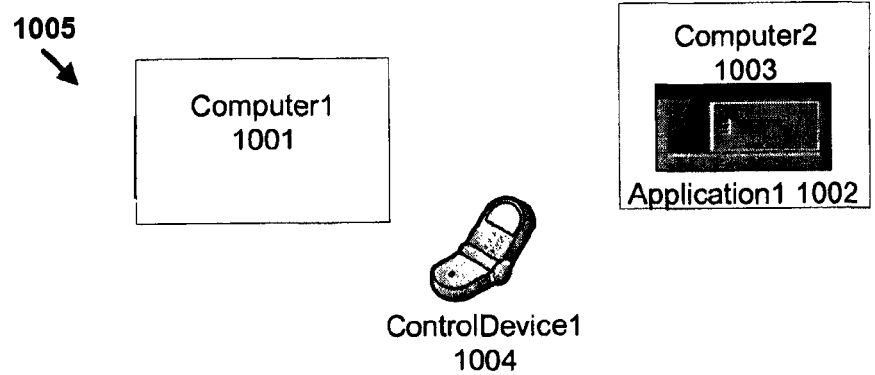
Figure 10C:
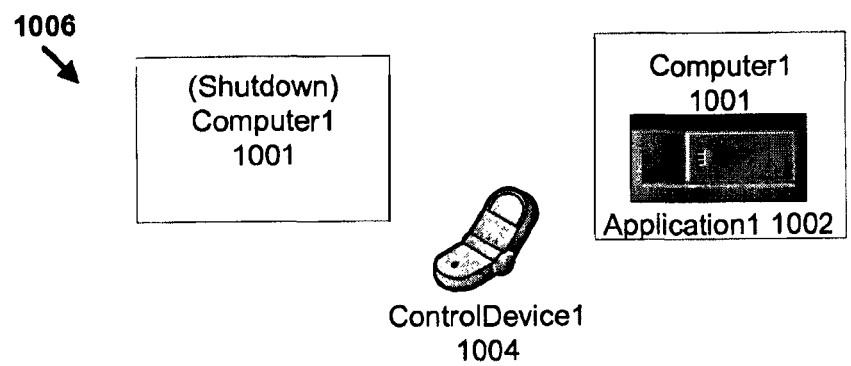

FIGS. 10A-10C illustrate an exemplary pervasive computing environment scenario wherein a software application is independent from a hardware device, according to one embodiment. A laptop can be 'running' an application, be shutdown, and the application remains in operation. An exemplary pervasive operation environment 1000 includes a control device 1004 (for example, an iPhone or Wii-mote), a computer1 1001, and a computer2 1003. Computer1 1001 is 'running' application1 1002. Control device 1004 can provide input, for example a waving motion toward computer2 1003, and the environment shifts to that as illustrated in 1005. Environment 1005 includes the computer1 1001, the control device 1004, and computer2 1003, however computer2 1003 is now 'running' application1 1002. Application1 1002 is displayed/running in the same state as it was when it left computer1 1001.

Yet another exemplary environment 1006 includes computer1 1001, computer2 1003, and control device 1004. Computer1 1001 can be shutdown and application1 1002 will still run on computer2 1003.

FIGS. 11A-11E illustrate an exemplary pervasive computing environment scenario wherein an application moves from an electronic newspaper to a table surface, according to one embodiment. A user enters a personal computing environment and resumes an application (presentation) which was saved in a sleeping state in the cloud operating environment. It is legacy application and the flexible screen would not normally able to run it because of the lack of a legacy operating system on it. However it is visually streamed from the cloud operating environment and the electronic newspaper's built-in decoder displays is. A user interface (UI) shell enables responsive local dragging and resizing of the on-screen objects to mitigate latency effects of running a remote application. The user drags the application to a discovered public projection device (which has a computing unit attached to it, the unit has network connectivity). The cloud operating environment recognizes this and starts streaming the application to a new device.

An exemplary environment 1100 includes a user1 1102, a flexible screen 1101 (for example, an electronic newspaper), and a wireless network adapter 1103. In an exemplary environment 1104, the user1's 1102 data 1105 is streamed using the above referenced protocol and cloud operating environment to the flexible screen 1101. As illustrated in exemplary environment 1106, user1 1102 may have an application 1109 streamed to the flexible screen 1101.

Yet another exemplary environment 1110 and 1114 include the addition of a projector 1107 and a projection surface 1108. User1 may drag the application1 1109 to the projection surface 1108, and the cloud operating environment starts streaming the application using the above referenced protocol to the projection device 1108. User1 1102 can provide input 1112 to a control device 1111, and the application streaming to the projection surface 1108 responds 1113.

Figure 12:
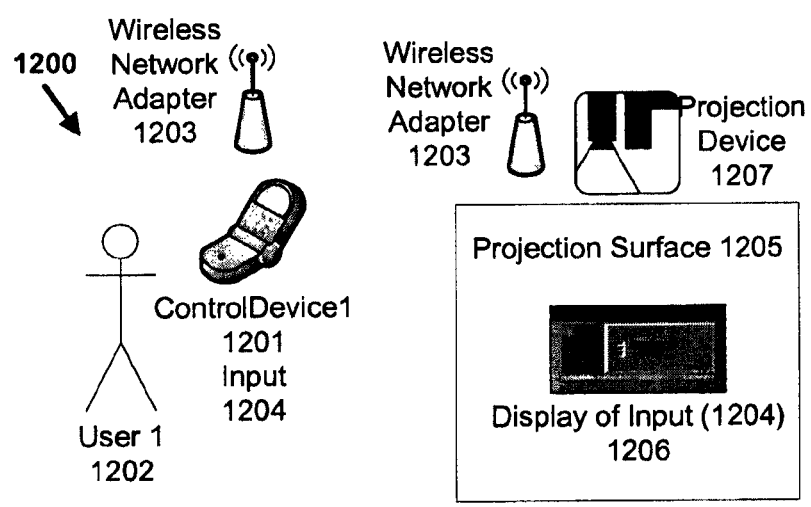
FIG. 12 illustrates an exemplary pervasive computing environment scenario wherein a control device controls other devices and applications, according to one embodiment.

FIG. 12 illustrates an exemplary pervasive computing environment scenario wherein a control device controls other devices and applications, according to one embodiment. An example of a control device may be an iPhone. An application is running on a projection table. The user sets the iPhone as an input device for the application and user invokes iPhones keyboard to type within the application. The iPhone input is redirected to the cloud operating environment, to a virtual machine, and then to the application code, which displays new letters and sentences. This new visual information is intercepted and transmitted to the projection device. A decoder on the computing device attached to the projector decodes the visual information which is displayed on the table. An exemplary pervasive environment 1200 includes a user1 1202 using a control device1 1201 having a means for input (for example, a keyboard), the control device 1201 is connected to a wireless network using a wireless network adapter 1203. Also connected to the wireless network using a wireless network adapter 1203 are a projector 1207 and a projection surface 1205. Input 1204 entered by the user1 1202 into control device1 1201 is displayed 1206 on the projection surface 1205.

FIGS. 13A-13D illustrate an exemplary pervasive computing environment scenario wherein a device responds to input from a control device, according to one embodiment. An exemplary pervasive computing environment 1300 includes a user1 1302 using a control device1 1301, connected to a wireless network using a wireless network adapter 1303. An HDTV 1304 is also connected to the wireless network 1303. Another exemplary environment 1307 includes user1 1302 entering input1 1305 into the control device1 1301, and a display of input1 1306 appearing on the HDTV 1304.

Another exemplary environment 1312 includes user1 1302 entering input2 1310 into a control device2 1310 (for example, a Wii-mote). A control device tracker 1308 tracks the movement of control device2 1310, and a display of the input2 1311 appears on the HDTV 1304. Yet another exemplary environment includes user1 1302 entering input3 1315 into a control device3 1314, and a response to the input3 1316 is displayed on the HDTV 1304. An example of input3 1316 can be resizing a frame in an application, utilizing an exemplary feature of an iPhone referred to as multi-touch.

Figure 14A:
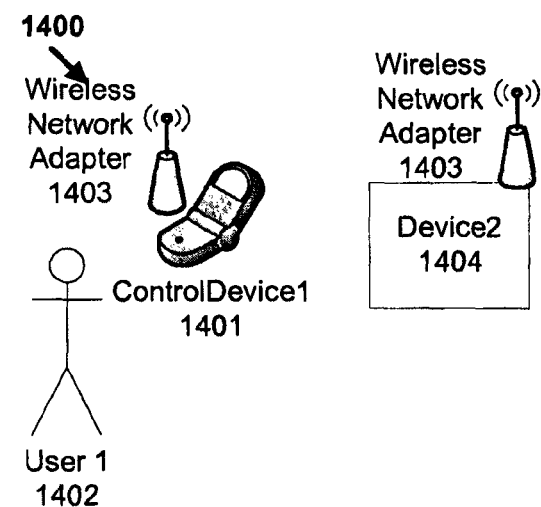
FIGS. 14A-14B illustrate an exemplary pervasive computing environment scenario wherein a device responds to input from a control device, according to yet another embodiment.
Figure 14B:
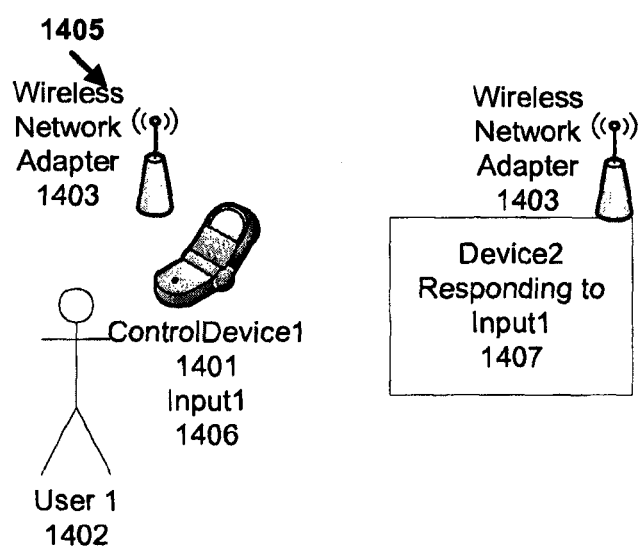

FIGS. 14A-14B illustrate an exemplary pervasive computing environment scenario wherein a device responds to input from a control device, according to yet another embodiment. An exemplary pervasive computing environment 1400 includes a user1 1402 using a control device1 1401 connected to a wireless network using a wireless network adapter 1403. User1 1402 can control a device2 1404 using control device1 1401, device2 1404 is connected a wireless network using a wireless network adapter 1403. In exemplary environment 1405, user1 1402 provides input1 1406 to control device1 1401, and device2 responds to input1 1407. An example of this device scenario includes an iPhone and a Roomba. The user can shake the iPhone or make gestures and the Roomba will move accordingly. This scenario is enabled using the above reference protocol and cloud operating environment.

The following are example scenarios, according to multiple embodiments of the present system. Those skilled in the art understand that while the invention has been described using two exemplary embodiments, other scenarios are possible in light of the present disclosure. For example, roles and relationships of the components can be exchanged and extended, in accordance to the principles of the invention. Examples terms and definitions include:

<id>—object that has persistent attributes.

[id]—named agent currently running somewhere in the system.

output=[sender]=>[receiver](args)—[sender] agent sends message to [receiver] and [receiver] agent responds with output.

Scenario 1
  Participants:
    User with id <user> and his\her supervisor [supervisor].
    iPhone with id <phone> and agent running on it [phone].
    Device <dev> and agent running on it [dev].
    Virtual machine manager [VMManager].
    Application id <app>.
    Virtual appliance where application is running: <va>.
  Scenario:
    User launches iPhone and enters user credentials.
    iPhone has id <phone>, user has id <user>.
    iPhone connects to access point and sends to user's supervisor requests:
    [phone]=>[supervisor]('acquire', {device: <phone>})
    Supervisor does:
    return acquire-(<phone>)
    iPhone sends request to supervisor "Get current state of <user>".
    state=[phone]=>[supervisor]('getState')
    Supervisor does:
    return getState( )
    iPhone shows list of all devices known to the user some of which are online and available.
    iPhone uses information in state obtained above.
    User selects device which is available now and chooses "Launch application".
    Selected device has id <dev>.
    iPhone sends request "List applications that can be launched on <dev>":
    apps=[phone]=>[supervisor]('getApps', {device:<dev>})
    Supervisor does:
    capabilities=<dev>.capabilities['consume', 'output']
    appList=[supervisor]=>[VMManager]('compatibleApps', capabilities)
    return appList
    iPhone shows the list of available applications that can be launched on this device.
    iPhone uses apps obtained above.
    User chooses application and launches it.
    Selected application has id <app>.
    iPhone asks supervisor "Launch <app> on <dev>":
    [phone]=>[supervisor]('launch', {app:<app>, device: <dev>})
    Supervisor asks VM manager to launch <app> on behalf of <user> with secret phrase.
    acquire(<dev>)
    <va>=[supervisor]=>[VMManager]('launch', {app: <app>, user:<user>})
    acquire(<va>)
    return Ok
    Supervisor tells <dev>: "Connect to <va>":
    connect('output', <va>, <dev>)
    Application appears on the device screen.
    iPhone input is redirected to the device and eventually to the application.
    Supervisor tells <phone> to redirect input to <dev>:
    connect('input', <phone>, <dev>)
    Device agent on <dev> broadcast received input to system and remote application through HVTP.
Scenario 2
  Participants:
    User with id <user> and his\her supervisor [supervisor].
    iPhone with id <phone> and agent running on it [phone].
    Mac with id <mac> and agent [mac], showing the remote application and holding iPhone input.
    PC with id <pc> and agent [pc].
  Scenario:
    User has application running on device (Mac) and iPhone input is redirected to this device as well.
    User has id <user> and associated supervisor [supervisor].
    Device id is <mac>, agent id is [mac].
    iPhone <phone> and agent [phone].
    Application is running on virtual appliance <va>.
    User walks near another device (PC) and uses his\her RFID card to authenticate on this device.
    The device's id is <pc>, it has agent running on it [pc].
    RFID hardware sends signal to [pc] containing user id <user>.
    [pc] notifies supervisor that user has approached PC:
    state=[pc]=>[supervisor]('acquire', {device:<pc>})
    . . . (same steps as in "Launch application from iPhone")
    PC can display current state of the all user devices.
    Application migrates from Mac to PC.
    PC asks supervisor to move all output to itself:
    [pc]=>[supervisor]('redirectAll', {type:'output', device: <pc>})
    Supervisor redirects output from all owned devices to PC:
    redirectAll('output', <pc>)
    iPhone input now is redirecting to PC.
    PC asks supervisor to get input from all owned devices:
    [pc]=>[supervisor]('redirectAll', {type:'input', device: <pc>})
    Supervisor asks all input devices to connect to PC:
    redirectAll('input', <pc>
    According to one embodiment, a supervisor can utilize several functions including but not limited to:
    acquire(device):
    <device>.online=True
    <device>.currentOwner=<user>
    <user>.ownedDevices.append(<device>)
    return Ok
    release(device):
    if <device>.currentOwner !=<user>: return Ok
    <device>.currentOwner=None
    <user>.ownedDevices.remove(<device>)
    return Ok
    getState( )
    devices=<user>.knownDevices
    output=[ ]
    for each <device> in devices: output.append({id:<device>, location:<device>.location, name: <device>.name, available: <device>.online and <device>.currentOwner==None, . . . })
    return output
    connect(type, producer, consumer):
    secret=randomString( )
    if <producer>.role[type]==Both and <consumer>.role[type]==Both: server=<producer>, client=<consumer>
    if <producer>.role[type]==Both and <consumer>.role[type]==Passive: server=<consumer>, client=<producer>
    if <producer>.role[type]==Both and <consumer>.role[type]==Active: server=<producer>, client=<consumer>
    . . .
    if <producer>.role[type]==<consumer>.role[type]: return Error
    [supervisor]=>[server]('acceptConnection', {type:type, from:client, secret secret})
    [supervisor]=>[client]('makeConnection', {type:type, to:server, secret secret})
    <user>.connections.append({type:type, producer:<producer>, consumer:<consumer>}
    return Ok

```
disconnect(type, producer, consumer):
  [supervisor]=>[producer]('disconnect', {role:'producer',
      type:type, with:<consumer>})
  [supervisor]=>[consumer]('disconnect',  {role:'con-
      sumer', type:type, with:<producer>})
  <user>.connections. remove({type:type, producer:<pro-
      ducer>, consumer:<consumer>}
  return Ok
redirectAll(type, consumer):
  for each {conType, con Producer, conConsumer} in
      <user>.connections: if conType==type and conCon-
      sumer !=consumer: disconnect(conType, con Producer,
      conConsumer); connect(conType, conProducer, con-
      sumer)
```

A method and system for pervasive computing are disclosed. It is understood that the embodiments described herein are for the purpose of elucidation and should not be considered limiting the subject matter of the present embodiments. Various modifications, uses, substitutions, recombinations, improvements, methods of productions without departing from the scope or spirit of the present invention would be evident to a person skilled in the art.

We claim:

1. A system comprising:
   a plurality of client devices connected to a cloud computing environment;
   an application server connected to the cloud computing environment;
   a supervisor server communicating with the plurality of client devices and the application server over the cloud computing environment, the supervisor server including processor hardware for executing a plurality of operations, the plurality of operations including:
      executing an application program at the application server;
      streaming the application program from the application server to a first client device of the plurality of client devices;
      receiving, from the first client device, an indication of a second client device detected within a vicinity of the first client device, wherein the first and second client devices include a device agent to be able to communicate with the cloud computing environment and further to detect presence of other client devices within a geographic vicinity;
      authenticating the second client device in association with the cloud computing environment; and
      subsequent to authenticating the second client device, transferring streaming of the application program to the second client device instead of to the first client device;
      wherein, said receiving an indication of a second client device further includes:
      automatically recognizing, by the first client device, presence of the second client device when the first client device is within a specified physical distance from the second client device.

2. The system of claim 1, wherein said transferring streaming of the application program further includes:
   automatically transferring streaming of the application program to the second client device instead of to the first client device, subsequent to said authentication, without requiring any input from a user of the first client device or the second client device.

3. The system of claim 1, wherein said transferring streaming of the application program further includes:
   receiving, from the first client device, a user-initiated gesture indicating an intent to transfer said streaming of the application program to the second client device instead of to the first client device.

4. The system of claim 1, wherein said streaming of the application program includes:
   receiving, by the application server, an input stream associated with user input to the application program, from a client device of the plurality of client devices; and
   transmitting, by the application server, an application output stream associated with the execution of the application program, to the client device;
   wherein, the client device includes a user interface shell configured to receive the user input and present the application output.

5. The system of claim 1, wherein said transferring streaming of the application program further includes:
   detecting, by the supervisor server, a state point of the application program at which streaming of the application program stopped prior to said transferring; and
   initiating, by the supervisor server, streaming of the application program from the application server to the second client device, wherein the initiated streaming commences at the detected state point.

6. The system of claim 1, wherein said plurality of operations further includes:
   receiving, by the supervisor server, an indication that the first client device is not within a vicinity of the previously detected second client device; and
   transferring streaming of the application program back to the first client device instead of to the second client device.

7. A method of operating a pervasive computing environment, the method comprising:
   connecting a plurality of client devices and an application server to a cloud computing environment, wherein the cloud computing environment includes a supervisor server communicating with the plurality of client devices and the application server over the cloud computing environment, the supervisor server further including processor hardware;
   executing, by the supervisor server, an application program in the application server;
   streaming, by supervisor server, the application program from the application server to a first client device of the plurality of client devices;
   receiving, from the first client device, an indication of a second client device detected within a vicinity of the first client device, wherein the first and second client devices include a device agent to be able to communicate with the cloud computing environment and further to detect presence of other client devices within a geographic vicinity;
   authenticating the second client device in association with the cloud computing environment; and
   subsequent to authenticating the second client device, transferring streaming of the application program to the second client device instead of to the first client device;
   wherein, said receiving an indication of a second client device further includes:
   automatically recognizing, by the first client device, presence of the second client device when the first client device is within a specified physical distance from the second client device.

8. The method of claim 7, wherein said transferring streaming of the application program further includes:
   automatically transferring streaming of the application program to the second client device instead of to the first client device, subsequent to said authentication, without requiring any input from a user of the first client device or the second client device.

9. The method of claim 7, wherein said transferring streaming of the application program further includes:
receiving, from the first client device, a user-initiated gesture indicating an intent to transfer said streaming of the application program to the second client device instead of to the first client device.

10. The method of claim 7, wherein said streaming of the application program includes:
receiving, by the application server, an input stream associated with user input to the application program, from a client device of the plurality of client devices; and
transmitting, by the application server, an application output stream associated with the execution of the application program, to the client device;
wherein, the client device includes a user interface shell configured to receive the user input and present the application output.

11. The method of claim 7, wherein said transferring streaming of the application program further includes:
detecting, by the supervisor server, a state point of the application program at which streaming of the application program stopped prior to said transferring; and
initiating, by the supervisor server, streaming of the application program from the application server to the second client device, wherein the initiated streaming commences at the detected state point.

12. The method of claim 7, further comprising:
receiving, by the supervisor server, an indication that the first client device is not within a vicinity of the previously detected second client device; and
transferring streaming of the application program back to the first client device instead of to the second client device.

13. A pervasive computing environment comprising:
a plurality of client devices connected to the pervasive computing environment;
an application server connected to the pervasive computing environment;
a supervisor server communicating with the plurality of client devices and the application server over the pervasive computing environment, the supervisor server including processor hardware for executing a plurality of operations, the plurality of operations including:
executing an application program in the application server;
streaming the application program from the application server to a first client device of the plurality of client devices;
receiving, from the first client device, an indication of a second client device detected within a vicinity of the first client device, wherein the first and second client devices include a device agent to be able to communicate with the pervasive computing environment and further to detect presence of other client devices within a geographic vicinity;
wherein said receiving an indication of a second client device further includes:
automatically recognizing, by the first client device, presence of the second client device when the first client device is within a specified physical distance from the second client device;
authenticating the second client device in association with the cloud computing environment; and
subsequent to authenticating the second client device, transferring streaming of the application program to the second client device instead of to the first client device.

14. The pervasive computing environment of claim 13, wherein said transferring streaming of the application program further includes:
automatically transferring streaming of the application program to the second client device instead of to the first client device, subsequent to said authentication, without requiring any input from a user of the first client device or the second client device.

15. The pervasive computing environment of claim 13, wherein said transferring streaming of the application program further includes:
receiving, from the first client device, a user-initiated gesture indicating an intent to transfer said streaming of the application program to the second client device instead of to the first client device.

16. The pervasive computing environment of claim 13, wherein said streaming of the application program includes:
receiving, by the application server, an input stream associated with user input to the application program, from a client device of the plurality of client devices; and
transmitting, by the application server, an application output stream associated with the execution of the application program, to the client device;
wherein, the client device includes a user interface shell configured to receive the user input and present the application output.

17. The pervasive computing environment of claim 13, wherein said transferring streaming of the application program further includes:
detecting, by the supervisor server, a state point of the application program at which streaming of the application program stopped prior to said transferring; and
initiating, by the supervisor server, streaming of the application program from the application server to the second client device, wherein the initiated streaming commences at the detected state point.

18. The pervasive computing environment of claim 13, wherein said plurality of operations further includes:
receiving, by the supervisor server, an indication that the first client device is not within a vicinity of the previously detected second client device; and
transferring streaming of the application program back to the first client device instead of to the second client device.

19. The pervasive computing environment of claim 18, wherein said plurality of operations further includes:
receiving, by the supervisor server, an indication that the first client device is not within a vicinity of the previously detected second client device; and
transferring streaming of the application program to a third client device instead of to the second client device.

20. The pervasive computing environment of claim 19, wherein the third client device is previously registered as an authenticated client in association with the cloud computing environment.

* * * * *